United States Patent [19]

Kuroda et al.

[11] Patent Number: 4,928,107
[45] Date of Patent: May 22, 1990

[54] SIGNAL RECEIVING METHOD FOR A USER'S DEVICE IN A GLOBAL POSITIONING SYSTEM

[75] Inventors: Hiroshi Kuroda; Atsushi Watanabe, both of Hitachi, Japan

[73] Assignees: Hitachi, Ltd., Tokyo; Hitachi Engineering Co., Ltd., Ibaraki, both of Japan

[21] Appl. No.: 367,665

[22] Filed: Jun. 19, 1989

[30] Foreign Application Priority Data

Jun. 22, 1988 [JP] Japan .................. 63-152215

[51] Int. Cl.$^5$ .................. G01S 5/02; H04B 7/185; G01C 21/00
[52] U.S. Cl. .................. 342/357; 342/451; 364/449
[58] Field of Search .................. 342/356, 357, 451; 364/449

Primary Examiner—Thomas H. Tarcza
Assistant Examiner—Gregory C. Issing
Attorney, Agent, or Firm—Antonelli, Terry, Stout & Kraus

[57] ABSTRACT

In a user's device of a GPS, the calculation of GDOP values for determining satellites to be used for the positioning is initiated periodically with a predetermined operation period. Once they are determined in a certain operation period, the processing for the positioning is repeatedly executed on the basis of signals from the determined satellites through the operation period, until satellites to be used are determined in a succeeding operation period. Plural times of the positioning can be executed for every time of the calculation of a GDOP value. If, therefore, a frequency of executing the positioning are made almost as equal as conventionally, a frequency of carrying out the time-consuming calculation of GDOP values is decreased, whereby the load of a microprocessor in the user's device can be remarkably reduced.

14 Claims, 8 Drawing Sheets

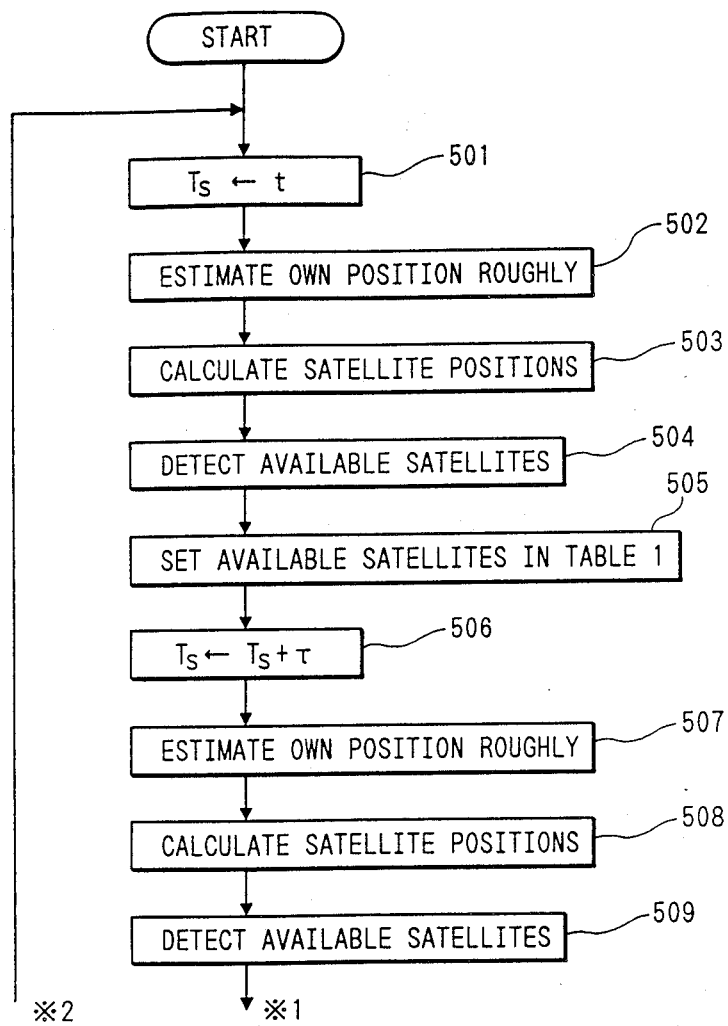

SIGNAL RECEIVING METHOD FOR A USER'S DEVICE IN A GLOBAL POSITIONING SYSTEM

BACKGROUND OF THE INVENTION

1. Field of the invention

The present invention relates to a signal receiving method for a user's device in a global positioning system (abbreviated as GPS, hereinafter), which receives signals from GPS satellites and determines a precise position of a user, and especially to an improved signal receiving method capable of reducing the amount of calculation necessary for determining satellites to be used for the positioning.

2. Description of the related art

As is well known, a GPS is a universal positioning or navigation system. In the fully implemented system, three GPS satellites are arranged in each orbit and total 18 satellites are in six orbits, whereby signals from some of the GPS satellites are always available anywhere on the earth.

A user of the GPS selects plural satellites available to him at that time and determines three or four from among the available satellites. The user carries out the calculation for the positioning on the basis of signals transmitted from the three or four satellites.

It is also known that signals from four satellites are needed in order to determine the three-dimensional position of a user, and signals from three satellites are sufficient in the two-dimensional positioning; typical examples of the former are satellite and airplane, and those of the latter are ship and car. However, a car often requires the three dimensional positioning, when it travels in a mountain district.

The determination of three or four satellites to be used from among the available ones is usually performed, based on a value of a geometric dilution of precision (abbreviated as GDOP, hereinafter), which has been already known in a navigation technique, especially in a hyperbolic navigation, and is an index of a positioning accuracy depending on the spatial arrangement of the three or four satellites to be used with respect to a user.

In other words, a GDOP value can be said to indicate a degree of scope of an error, which can occur when a user's precise position is specified. A combination of satellites, which has a smaller GDOP value, can provide the more precise positioning.

The GPS is discussed, for example, in the article "The development of NAVSTAR/GPS and its system" by Shoichi Kimura on pages 41 to 79 of the magazine "Zosen Gijutsu (Shipbuilding Technique)", published May, 1987, or the article "Analysis of the usable time and the positioning accuracy for the phase II GPS" by Shuji Nishi on pages 57 to 65 of the transactions (February, 1982) of the Institute of Navigation of Japan.

In a conventional user's device of the GPS, including examples discussed in the aforesaid articles, GDOP values are calculated with respect to all of the combinations possible, each comprising three or four selected from among satellites available to a user at that time, and a best combination of satellites, which usually has a smallest GDOP value, is selected; namely, satellites included in the selected combination are determined as satellites to be used for the positioning. Signals transmitted from the thus determined satellites are used in the processing for the positioning.

By the way, since GPS satellites are not geostationary satellites, GDOP values of combinations of satellites change every minute. Therefore, GDOP values are always monitored, and a combination of satellites, which has come to have a GDOP value larger than a desired value, is changed by another combination of satellites, which has a GDOP value smaller than the desired value. In the conventional user's device, such calculation of GDOP values is always carried out before execution of the processing for the positioning.

When the calculation of GDOP values is carried out, a microprocessor in a user's device of the GPS is devoted only for that purpose, and in the mean time, it is not allowed to execute the processing for the positioning. The calculation of GDOP values is considerably time-consuming, and therefore, if it is carried out so often as in the conventional user's device, not only the load of the microprocessor increases remarkably, but also the operation time of the microprocessor, which is occupied by the calculation of GDOP values, becomes considerably long, compared with the operation time for execution of the processing for the positioning. As a result, there occurs an undersired problem that a time duration, in which the positioning is impossible, increases.

In addition, for the communication between GPS satellites and a user, there is usually used a spread spectrum modulation method, which consumes considerable time for preparing a receiver in a user's device to receive satellite signals. If, therefore, the switchover of satellites occurs often, this also causes further increase of the positioning impossible time.

SUMMARY OF THE INVENTION

An object of the present invention is to provide an improved signal receiving method for a user's device in a GPS, which is capable of decreasing a frequency of carrying out the calculation of GDOP values for determining satellites to be used for the positioning, whereby the load of a microprocessor in the user's device can be remarkably reduced.

A feature of the present invention resides in a signal receiving method for a user's device of a GPS, in which a predetermined period for the repetitive operation is preset; the detection of satellites available to a user is periodically carried out with the predetermined operation period; GDOP values are calculated with respect to every combination of satellites, each combination including some of the available satellites detected, a number of which depends on the required dimension of the positioning; satellites included in one of the combinations of satellites, which has a GDOP value smaller than a desired value, are determined as satellites to be used for the positioning; and the processing for the positioning is repeatedly executed on the basis of signals from the determined satellites through one operation period.

According to the present invention as described above, plural times of the positioning are executed for one time of carrying out the calculation of GDOP values. Therefore, a frequency of carrying out the time-consuming calculation of GDOP values can be decreased, during which a microprocessor in a user's device is not allowed to execute the processing for the positioning.

Although, during an operation period, the spatial arrangement of satellites changes and accordingly a GDOP value of a combination of satellites then used may change to increase, such an undesirable increase of the GDOP value, which in turn causes the increase of an error in the positioning, can be suppressed by deciding a predetermined operation period appropriately. In other words, if combinations of satellites can be switched over with such a predetermined operation period that GDOP values of the respective combinations of satellites always become less than a desired value, the sufficient accuracy of the positioning can be secured.

The signal receiving method as described above will be further improved by such a feature of one of embodiments of the present invention that a number of times of the switchover of satellites can be reduced. According thereto, satellites to be used for the positioning are determined from among satellites available to a user as long as possible, e.g., for at least two operation periods. In this case, although GDOP values must be allowed to vary more or less, but within a predetermined allowable scope, the frequency of the switchover of satellites is decreased, whereby the time duration, in which the positioning is impossible due to the switchover operation, decreases.

Further, according to a feature of another embodiment, the switchover operation will be much improved. According thereto, when the switchover of satellites is carried out, an old satellite to be excluded from the consideration is switched over to a new satellite to be incorporated in a combination of satellites to be used for the positioning, while continuously receiving a signal from the old satellite until the switchover to the new satellite is not completed. Therefore, the time duration, in which the positioning is impossible due to the switchover of satellites, never occurs.

BRIEF DESCRIPTION OF THE DRAWINGS

FIG. 5a and 5b show a flow chart of the processing operation executed by a microprocessor in the user's device to implement the method of the another embodiment;

DESCRIPTION OF THE PREFERRED EMBODIMENTS

In the following, explanation will be made of a signal receiving method for a user's device of the GPS according to embodiments of the present invention, with reference to accompanying drawings.

Figure 1:
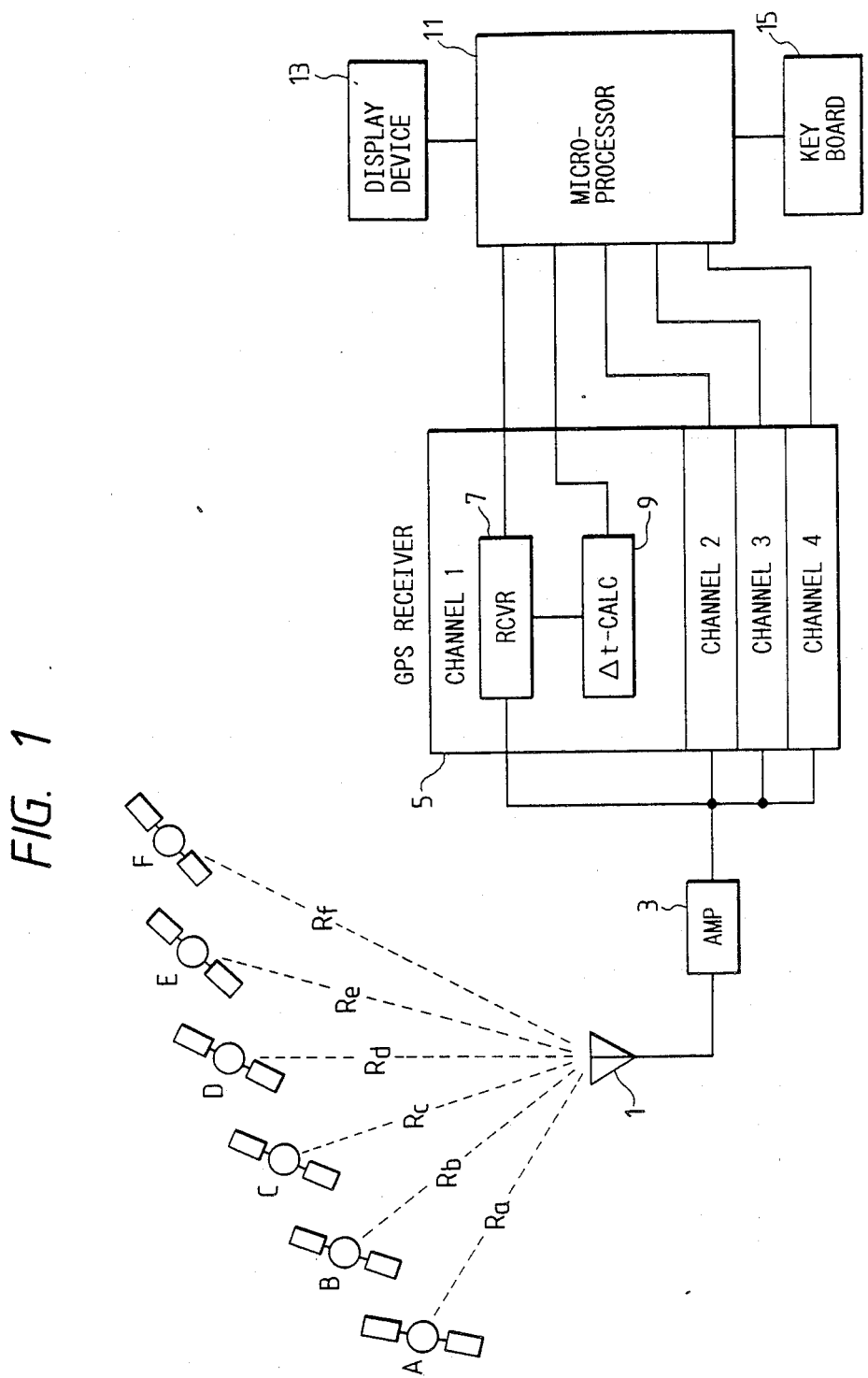
FIG. 1 schematically shows an overall configuration of a user's device in the GPS, to which the present invention is applied.

First of all, FIG. 1 shows an overall configuration of a user's device of the GPS. In the figure, reference numeral 1 denotes an antenna for receiving signals transmitted from GPS satellites A, B, C, D, E and F. Further, $R_a$, $R_b$, $R_c$, $R_d$, $R_e$ and $R_f$ indicate so called pseudo ranges between the respective satellites and a user, which will be discussed later, again.

The antenna 1 is coupled to amplifier 3, in which the feeble satellite signals received by the antenna 1 is subject to the amplification and the frequency conversion to be supplied to GPS receiver 5. In this embodiment, the receiver 5 is provided with four channels, whereby the user's device can receive signals from four satellites simultaneously.

As the receiver 5, there is usually used a known receiver of the spread spectrum demodulation type. Namely, since signals being transmitted from the satellites A, B, C, D, E, F are subject to the spread spectrum modulation, the receiver 5 performs the demodulation on the basis of the inverse spread spectrum and extracts necessary data from the satellite signals. Such a satellite signal usually includes clock data, almanac data, ephemeris data and so on.

Each channel of the receiver 5 has receiver part 7 and $\Delta t$-calculation part 9. The receiver part 7 outputs ephemeris data extracted from a received satellite signal, and the $\Delta t$-calculation part 9 has its own clock data and calculates a time difference $\Delta t$ between its own clock data and the clock data extracted from a received satellite signal. Therefore, the time difference $\Delta t$ means a propagation time of a signal from a satellite to a user.

The output data of the receiver part 7 and the $\Delta t$-calculation part 9 are supplied to microprocessor 11. In the figure, although the connection of the channels 2 to 4 to the microprocessor 11 is indicated by single lines, respectively, it is to be understood that they are coupled to the microprocessor 11 in the same manner as the channel 1.

In the microprocessor 11, the predetermined processing as described later is carried out on the basis of the data supplied by the respective channels of the receiver 5, and processed data are supplied to display device 13 to give a user the information of his precise position in the visual form. Also, key board 15 is coupled to the microprocessor 11 in order to supply other necessary data thereto.

Figure 2:
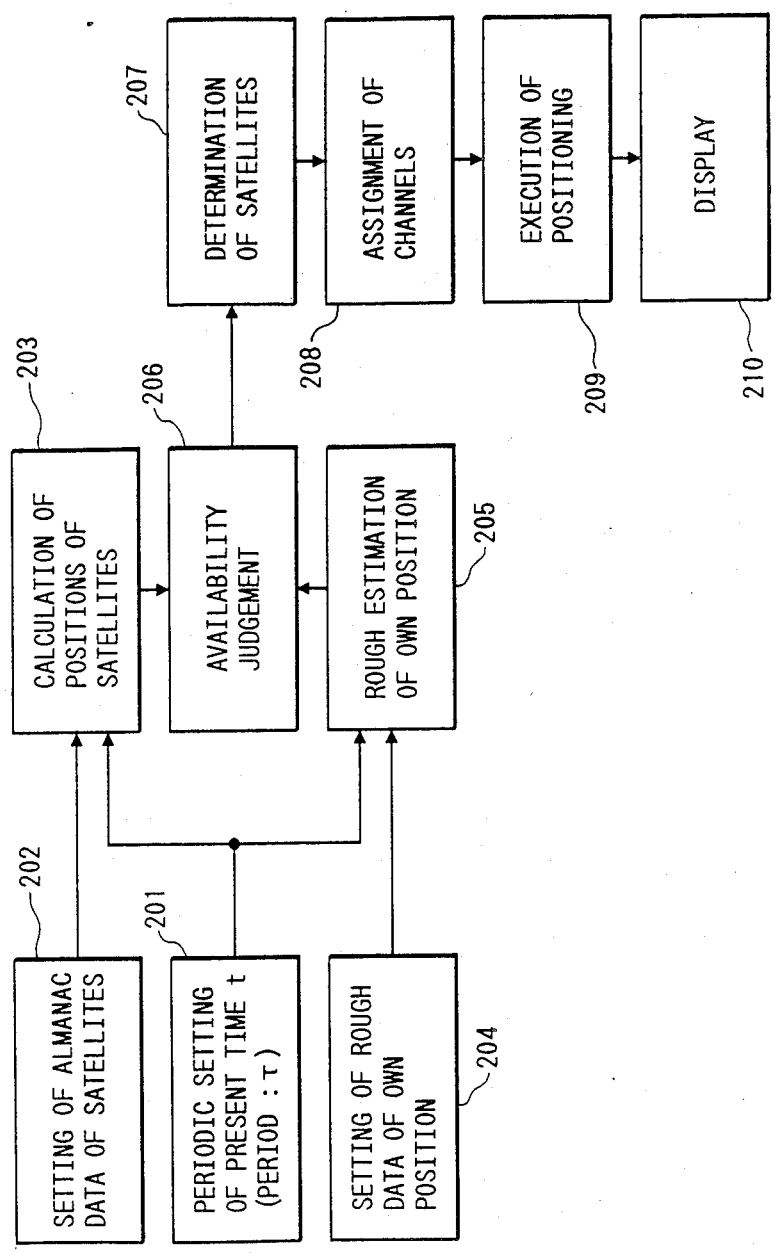
FIG. 2 is a functional block diagram showing the operation of a signal receiving method according to an embodiment of the present invention.

Referring to FIG. 2 showing the functional block diagram, which includes the function of the signal receiving method according to an embodiment of the present invention, the operation of the user's device as mentioned above will be explained hereinafter.

When the microprocessor 11 starts the operation, a present time t is at first set (block 201). The setting of the present time t is performed periodically with an operation period $\tau$. One of factors for determining this period $\tau$ is the kind of a user, such as satellite, airplane, ship, car and so on.

According to the inventors' experimental simulation, in which the positioning of a satellite orbiting at a speed of 7 km/sec in a circular orbit of an altitude of 400 km was attempted, if the operation period $\tau$ is set at about 5 minutes, GDOP values could be maintained less than four, which is a usual target value for the precise positioning. Inversely, it can be said that the operation period $\tau$ is to be decided at such a value that satellites are selectively switched over with GDOP values of combinations of satellites always maintained less than a desired value.

Almanac data of GPS satellites are set (block 202). Since almanac data of a satellite includes information of an orbit of the satellite, a present position of the satellite can be obtained on the basis of the almanac data, if only a present time is given. Therefore, present positions of all satellites in all orbits can be specified by calculation on the basis of almanac data of those satellites and the present time t (block 203).

Further, every satellite has a memory for storing its own almanac data and sends out the data toward the earth therefrom. A content of the memory is updated by a GPS control station on the ground at regular intervals. Therefore, a user can receive almanac data sent out from a satellite and use it for the determination of a position of a satellite.

Although almanac data sent from a satellite are most recent data concerning an orbit of the satellite and may be more accurate, data initially provided in a user's device, as described above, are sufficient for this purpose, since orbit data of a satellite do not change so frequently and, as will be apparent later, no strictly exact position of the satellite is required in this stage of the operation.

Then, data of the user's own position are set (block 204). Those are sufficient to be such a very rough data that indicate an area of several hundred kilometers around. On the basis of such data, the user's own position is estimated very roughly (block 205).

The following is the reason why the rough estimation of the user's own position is sufficient. In this stage of the operation, as will be described below, satellites to be used for the positioning are determined only. Such satellites re necessary to be determined from among satellites available to a user at that time. For example, satellites, which are located on the side of the earth opposite to the user, are not available to him. Those satellites must be excluded from the consideration. Briefly, only satellites, which are within a user's view, are detected, and such satellites do not change so frequently depending on the position of the user.

From the positional relationship of the satellites selected and the user, the availability of the respective satellites to the user is judged (block 206). This judgement is done in accordance with such a simple algorithm that a directional vector toward a satellite from the user is directed above or below the horizon. If the directional vector of a satellite is directed above the horizon, the satellite is selected as one of the available satellites, and otherwise it is not.

Next, satellites to be used for the positioning are determined (block 207). To this end, all the combinations possible, each consisting of three or four selected from among the available satellites, are at first formed, and then GDOP values are calculated with respect to every combination of satellites. A combination of satellites having a smallest GDOP value is selected, whereby three or four satellites included in the selected combination are determined as satellites to be used for the positioning.

After the satellites to be used are determined, the channels of the receiver 5 are assigned to the respective satellites determined (block 208). The microprocessor 11 sets particular codes (called PN codes in the spread spectrum modulation system), which are assigned in advance to the respective satellites determined, in the receiver part 7 of the respective channels of the receiver 5.

When a channel of the receiver 5 receives such a code, the channel starts the preparation for getting only a signal from a satellite having a code aligned with the code set in the channel from among satellite signals received by the receiver 5. In the spread spectrum system, this operation is known as acquisition and tracking. The channel, when it was prepared, extracts ephemeris data of the corresponding satellite from the received signal, calculates the time difference $\Delta t$ and outputs them to the microprocessor 11.

Ephemeris data include information of a three dimensional position of a corresponding satellite. The ephemeris data is similar to the almanac data, however the accuracy of data is different to the great extent. The ephemeris data can provide the positional information of a satellite at the accuracy of less than ten meters, whereas the almanac data can only provide that at the accuracy of several ten kilometers.

On the basis of the ephemeris data as mentioned above, the processing for the positioning is executed (block 209). By way of example, let us assume that the four satellites A, B, C, D (cf. FIG. 1) were determined as the satellites to be used and the channels 1 to 4 of the receiver 5 were assigned to the respective satellites in order to receive the signals therefrom.

In this case, if the three dimensional positions of those satellites are expressed by $(A_X, A_Y, A_Z)$, $(B_X, B_Y, B_Z)$, $(C_X, C_Y, C_Z)$ and $(D_X, D_Y, D_Z)$ in the X-Y-Z three dimensional coordinate system, as well as the position of a user is represented by $(U_X, U_Y, U_Z)$ in the same coordinate system, the algorithm of the processing for the positioning is expressed as follows:

$$\left. \begin{aligned} R_a &= \sqrt{(A_X - U_X)^2 + (A_Y - U_Y)^2 + (A_Z - U_Z)^2} + M \\ R_b &= \sqrt{(B_X - U_X)^2 + (B_Y - U_Y)^2 + (B_Z - U_Z)^2} + M \\ R_c &= \sqrt{(C_X - U_X)^2 + (C_Y - U_Y)^2 + (C_Z - U_Z)^2} + M \\ R_d &= \sqrt{(D_X - U_X)^2 + (D_Y - U_Y)^2 + (D_Z - U_Z)^2} + M \end{aligned} \right\} \quad (1)$$

wherein $R_a$, $R_b$, $R_c$, $R_d$ indicate so called pseudo ranges between the respective satellites A, B, C, D and the user, and M indicates an error factor included in the pseudo ranges, which is caused by the difference between clocks of the satellites A, B, C, D and a user's clock. Further, the ranges $R_a$, $R_b$, $R_c$, $R_d$ are called pseudo ranges, not true ranges, since they include this error factor.

In the formulas (1) above, the pseudo ranges $R_a$, $R_b$, $R_c$, $R_d$ are given by the following formulas:

$$\left. \begin{aligned} R_a &= c \cdot \Delta t_1 \\ R_b &= c \cdot \Delta t_2 \\ R_c &= c \cdot \Delta t_3 \\ R_d &= c \cdot \Delta t_4 \end{aligned} \right\} \quad (2)$$

wherein c is the speed of light, and $\Delta t_1$ to $\Delta t_4$ represent the time differences measured by the $\Delta t$-calculation part 9 of the respective channels 1 to 4 of the receiver 5.

If the formulas (1) are solved with respect to four unknowns $U_X$, $U_Y$, $U_Z$ and M, the three dimensional position ($U_X$, $U_Y$, $U_Z$) of the user can be determined precisely.

From the foregoing, it will be apparent that if the user had such a very accurate clock as the satellites have, only three satellites would be required. Further, also in the case where the two-dimensional positioning is required, only three satellites are sufficient.

The thus obtained three dimensional position ($U_X$, $U_Y$, $U_Z$) of the user is displayed on the appropriate display device 13 (block 210).

In the following, there will be given the explanation of the processing operation carried out by the microprocessor 11 in order to achieve the function mentioned above, referring to FIG. 3.

When the operation starts, a present time t is set in a predetermined area $T_s$ defined within an storage of the microprocessor 11 at step 301. At step 302, the user's own position is estimated roughly, and then at step 303, present positions of all the satellites in all the orbits are calculated on the basis of the almanac data of the respective satellites. At step 304, available satellites are detected on the basis of the relationship of the roughly estimated user's own position and the calculated satellite positions.

At step 305, GDOP values are calculated with respect to all the combinations possible, each consisting of four satellites selected from among the available satellites detected at step 304. One of the combinations of satellites, which has a GDOP value smaller than a desired value, is selected at step 306; usually a combination with a smallest GDOP value is selected, and then satellites included in the selected combination are determined as satellites to be used for the positioning.

After the determination of the satellites to be used, at step 307, the microprocessor 11 reads out particular codes, which are assigned to the determined satellites, from a table provided therein and sets them in the receiver part 7 of the respective channels of the receiver 5 to thereby assign the channels 1 to 4 to the respective satellites.

At step 308, the time differences $\Delta t_1$ to $\Delta t_4$ concerning the respective satellites to be used are taken in the microprocessor 11 through the corresponding channels, and the pseudo ranges $R_a$, $R_b$, $R_c$ and $R_d$ are calculated on the basis of the time differences $\Delta t_1$ to $\Delta t_4$ in accordance with the formulas (2). Then, at step 309, the user's precise position is calculated in accordance with the formulas (1) on the basis of the pseudo ranges calculated at step 308 and the ephemeris data, which are given through the corresponding channels.

Thereafter, it is discriminated at step 310 whether or not the time $\tau$ has lapsed from the start of the processing operation. If the time $\tau$ does not lapse yet, the processing operation returns to step 308, and the calculation of the pseudo ranges and the execution of positioning are repeated on the basis of newly received signals from the same satellites as determined at step 306, until the time t reaches $T_s + \tau$.

The positioning is usually executed with a repetition period of 5 to 30 sec.. Therefore, assuming that the operation period $\tau$, as already described, is set at 5 min., 10 to 60 times of the positioning are repeatedly executed for every time of the calculation of GDOP values.

If it is judged at step 310 that the time $\tau$ has lapsed, the processing operation jumps back to step 301, and the same processing operation as mentioned above is repeated.

As apparent from the processing operation as described above, especially from steps 308 to 310, it will be understood that the positioning is repeatedly executed on the basis of ephemeris data transmitted from the satellites determined at step 306 through one operation period $\tau$. Namely, plural times of the positioning are executed for one time of the calculation of GDOP values. A frequency of carrying out the calculation of GDOP values can be reduced without decreasing a frequency of giving a user the information of his position, with the result that the load of the microprocessor 11 can be remarkably reduced.

Figure 4:
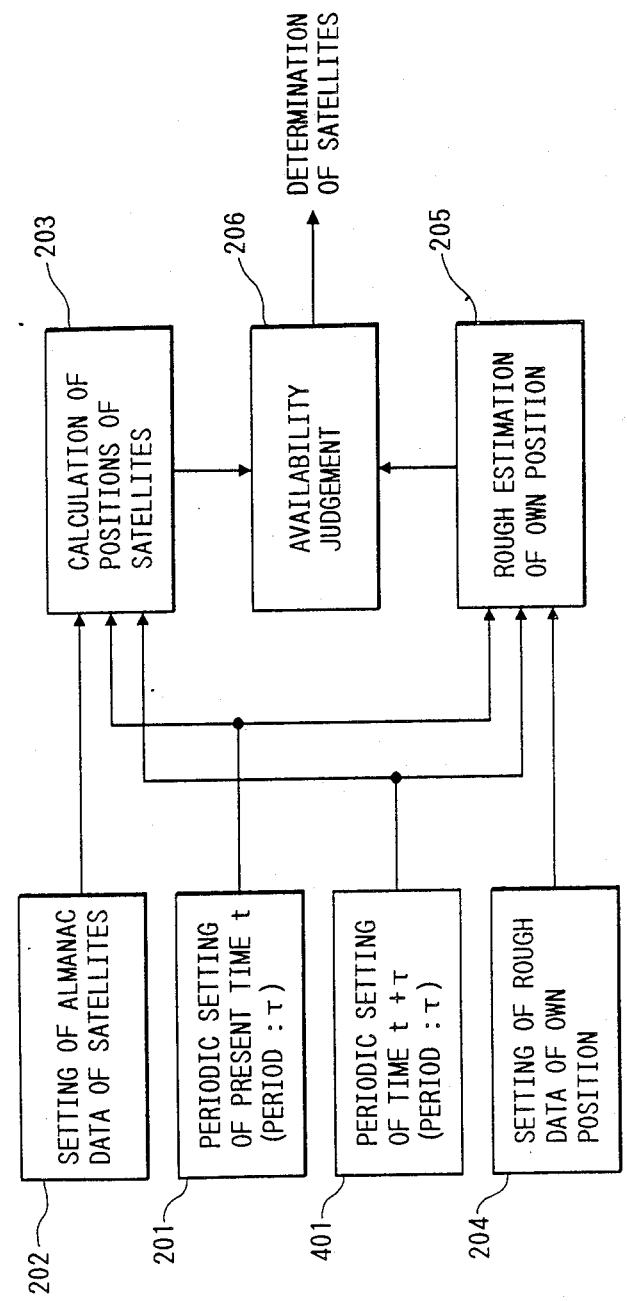
FIG. 4 is a functional block diagram showing the operation of a signal receiving method according to another embodiment of the present invention.

Referring next to FIG. 4, there will be given the explanation of a signal receiving method according to another embodiment of the present invention. FIG. 4 only shows a relevant part of the functional block diagram of the another embodiment, and the remaining part is the same as that shown in FIG. 2. Further, in the figure, identical blocks to those in FIG. 2 are denoted by identical reference numerals.

In this embodiment, a function of periodically setting a future time $t + \tau$ is newly added (block 401). With this function, the time $t + \tau$, which is preceded by $\tau$ from the present time t set by the function of the block 201, is periodically set. Also the period of setting this future time $t + \tau$ is $\tau$. Namely, in this embodiment, the time, which is preceded by one operation period $\tau$ from the present time t, is set as the future time.

The present time t and the future time $t + \tau$ are both given to the functions of the blocks 203 and 205. Therefore, positions of satellites are calculated with respect to two times, i.e., for the present time t and for the future time $t + \tau$, and also the user's own position are roughly estimated for the two times t and $t + \tau$.

By the function of the block 206, available satellites are detected with respect to the two times t and $t + \tau$, and then, by the function of the block 207 (not shown in this figure), GDOP values are calculated on the basis of the available satellites detected, and satellites to be used are determined therefrom. Although the function of the block 207 in this embodiment is somewhat different from that in the foregoing embodiment, details thereof will be apparent from the description made below with reference to FIGS. 5a and 5b.

Figure 5B:
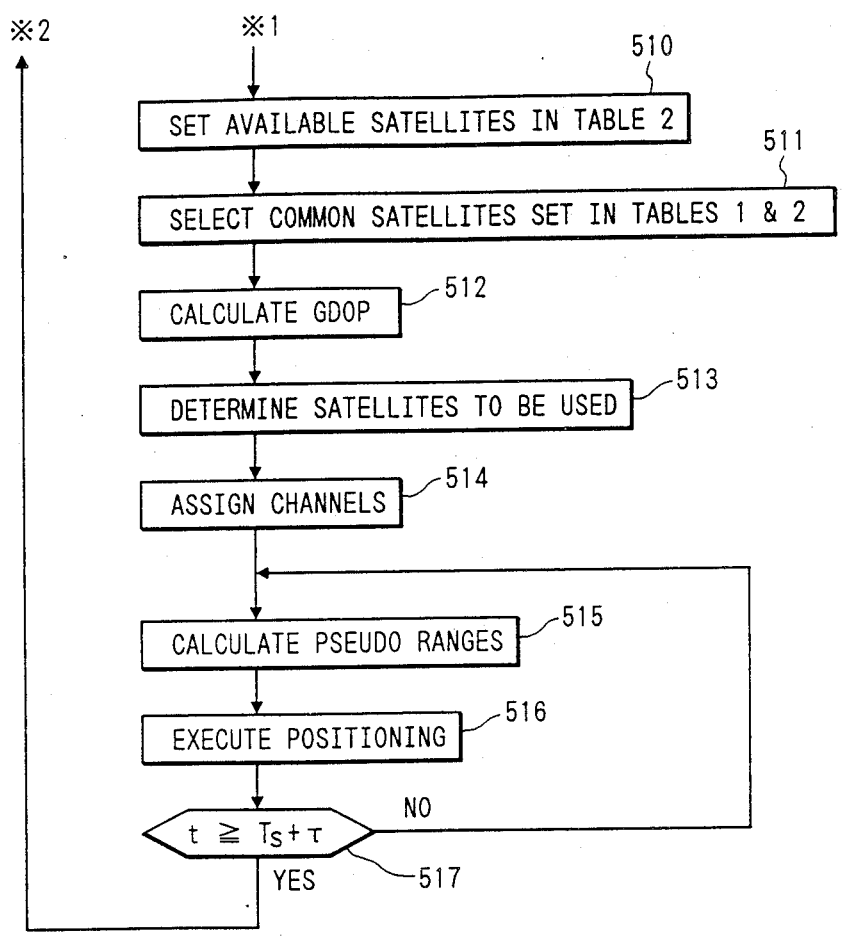

FIGS. 5a and 5b in combination show a flow chart of the processing operation to be executed by the microprocessor 11 to achieve the function as shown in the functional block diagram of FIG. 4.

Figure 3:
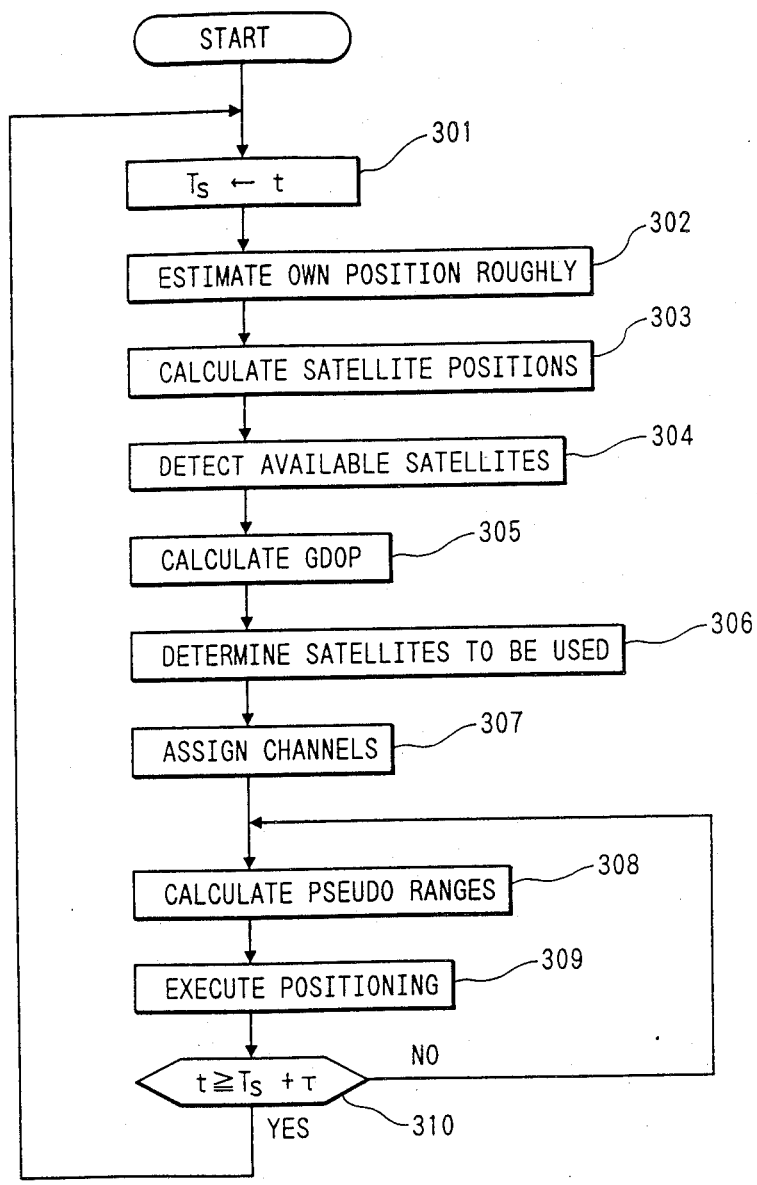
FIG. 3 shows a flow chart of the processing operation executed by a microprocessor in the user's device to implement the method of the embodiment of FIG. 2.

In the flow chart of those figures, the processing from step 501 to step 504 is the same as that from step 301 to step 304 in the flow chart of FIG. 3. Namely, satellites available to a user at the time t are detected. Then, at step 505, identifying numbers of the available satellites detected are once stored in a table 1 provided in a storage of the microprocessor 11.

Thereafter, at step 506, the future time $t + \tau$ is set by increasing the content of the area $T_s$ of the storage by $\tau$. Again, through steps 507 to 509, the same processing as steps 502 to 504 is repeated, whereby satellites available to the user at the future time $t + \tau$ are detected, and at step 510, identifying numbers of the available satellites detected are stored in a table 2 provided in the storage of the microprocessor 11.

At step 511, satellites, the identifying numbers of which are stored in common to the tables 1 and 2, are selected. Before the calculation of GDOP values is executed at step 512, combinations of satellites, GDOP values of which are to be calculated, are formed in such a manner that satellites stored in common to both the tables 1 and 2 are preferentially selected to be included in the combinations of satellites.

By way of example, if six satellites A, B, C, D, E, F are detected as available at step 504 and five satellites B, D, F, G, H are detected as available at step 509, the three satellites B, D, F common to both are always included to form the combinations of satellites, such as [A, B, D, F], [B, C, D, F], [B, D, E, F], [B, D, F, G] and so on.

At step 512, GDOP values are calculated with respect to the thus formed combinations of satellites. Then, at step 513, one of the combinations of satellites with a GDOP value smaller than a desired value is selected; usually a combination with a smallest GDOP value is selected, and satellites included in the selected combination are determined as satellites to be used for the positioning. Next, at step 514, the channels of the receiver 5 are assigned to the thus determined satellites.

The processing operation thereafter is the same as the corresponding portion (cf. steps 308 to 310) of the flow chart of FIG. 3. Therefore, also in this embodiment, a frequency of carrying out the calculation of GDOP values is decreased, so that the load of the microprocessor 11 can be reduced.

According to this embodiment, satellites to be used can be determined from among satellites available to a user as long as possible, and therefore the frequency of the switchover of satellites can be decreased. Accordingly, this embodiment can satisfy one of the important requirements for a user's device of the GPS that the frequency of the switchover of satellites is to be decreased as much as possible.

Further, in the embodiment mentioned above, the availability of satellites are predicted with respect to a future time, which is preceded by one operation period $\tau$ from a present time. The future time to be preceded for the prediction is to be determined within the allowable scope of the amount of processing by the microprocessor 11, because the amount of processing increases as the duration between a present time and a future time to be preceded.

Figure 6:
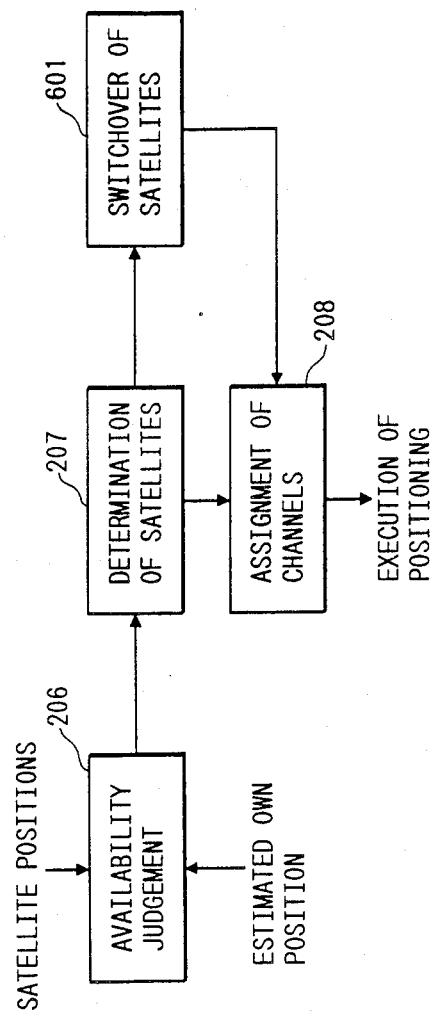
FIG. 6 is a functional block diagram showing the operation of a signal receiving method according to still another embodiment of the present invention.
Figure 7:
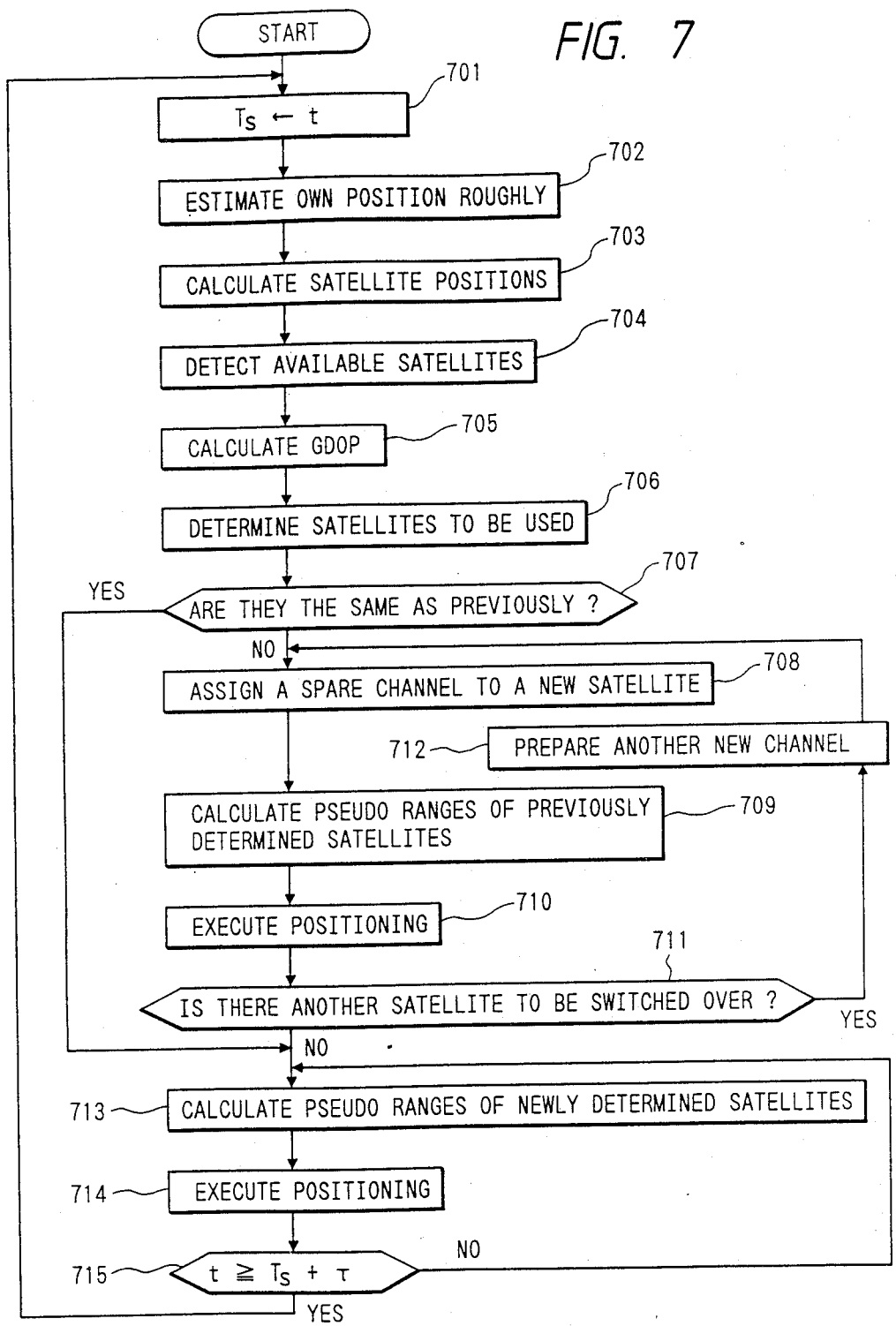
FIG. 7 shows a flow chart of the processing operation executed by a microprocessor in the user's device to implement the method of the still another embodiment.

Referring to FIGS. 6 and 7, still another embodiment of the present invention will be explained. FIG. 6 is a functional block diagram showing a relevant part of the function of the still another embodiment, and the remaining part is the same as that of FIG. 2. In the figure, identical blocks to those in FIG. 2 are denoted by identical reference numerals.

In this embodiment, there is newly added a function (block 601) for controlling the switchover of satellites so as not to interrupt the receiving of satellite signals. When a combination of satellites to be used through a certain operation period is determined differently from that used in the preceding period, this function controls how to switch over an old satellite to a new satellite without interrupting the receiving of satellite signals.

Incidentally, in most cases, one or two satellites in a previous combination are switched over by other one or two satellites, and there is scarcely the case where all of four satellites in the previous combination are substituted by four other satellites simultaneously.

In FIG. 6, similarly to the embodiment of FIG. 2, satellites to be used in the positioning for a certain operation period are determined (block 207), and then the determined satellites are compared with satellites used in the preceding operation period. If they are different from each other, the switchover of satellites is initiated (block 601), and otherwise, the switchover of satellites never occurs.

If the switchover of satellites is not needed in a certain operation period, the positioning in that period is executed by continuously using the same as satellites used in the preceding period through the whole duration of that period.

However, in the case where in a certain operation period a satellite or satellites used so far became necessary to be switched over by a new satellite or satellites, the switchover operation is initiated. At first, a channel of the receiver 5, which is off duty at that time, is assigned to a new satellite. As already described, however, the assigned channel can not be prepared quickly to get a signal from the new satellite. Then, the execution of the positioning is for now done by continuously using all the satellites used in the preceding period.

After the preparation of the assigned channel is completed, the positioning is executed by using the satellites including the new satellite switched over. Accordingly, the positioning can be executed without a break even during the switchover of satellites.

To achieve such switchover of satellites, the receiver 5 is necessary to be provided with at least one spare channel. For example, if the three dimensional positioning is required, the receiver 5 has to be provided with total five channels, which consists of four channels for receiving signals from four satellites and one spare channel. Similarly, in the case of the two dimensional positioning, the receiver 5 are provided with four channels.

The further detailed operation will be apparent from the description made below, referring to FIG. 7, which shows a flow chart of the processing operation executed by the microprocessor 11 to implement this embodiment.

Further, it is assumed in the following description that the three dimensional positioning is executed and therefore five channels, including one channel available for a spare, are provided in the receiver 5. However, it is not always determined what is dedicated to a spare channel, but one of the five channels selectively becomes a spare in accordance with the circumstances.

Referring now to FIG. 7, after the processing operation of a certain operation period starts, there is executed, from step 701 to step 706, the same processing operation as that of steps 301 to 306 in the flow chart of FIG. 3. After satellites to be used for the positioning in this operation period are determined at step 706, it is discriminated at step 707 whether or not they are the same as old satellites, which were determined in the preceding operation period and are now on receiving.

If they are the same as the old satellites, e.g., if when the old satellites are A, B, C, D, those satellites are determined again at step 706, the processing operation jumps to step 713, and thereafter the same processing operation as the corresponding portion of the flow chart of FIG. 3, i.e., steps 308 to 310, is carried out. Further, it is to be noted that the newly determined satellites in step 713 are the same as the old satellites A, B, C, D in this case.

If it is judged at step 707 that they are not the same, the processing operation goes to step 708. For example, if the satellites determined at step 706 are B, C, D, E, the satellite E is new. Then, at step 708, a spare channel of the receiver 5 is assigned to the satellite E, whereby the spare channel starts the preparation for receiving a signal from the satellite E. After that, the microprocessor 11 performs the processing operation of step 709 and the following steps.

It is to be noted here that first to fourth channels of the receiver 5 are still on duty and receive signals from the old satellites A, B, C, D. Therefore, in those channels, the respective time differences $\Delta t_1$ to $\Delta t_4$ are calculated on the received satellite signals. At step 709, the microprocessor 11 takes therein the time differences $\Delta t_1$ to $\Delta t_4$ and calculates the pseudo ranges $R_a$, $R_b$, $R_c$, $R_d$ between the old satellites A, B, C, D and the user. Then, at step 710, the positioning is executed on the basis of the thus calculated pseudo ranges $R_a$, $R_b$, $R_c$, $R_d$ and ephemeris data extracted from the signals of the satellites A, B, C, D.

After the aforesaid execution of positioning, it is discriminated at step 711 whether or not there is another satellite to be switched over, i.e., whether or not there is in the newly determined satellites included another satellite different from the old satellites. Further, the aforesaid preparation of the spare channel of the receiver 5 is usually completed till step 711.

If it is judged at step 711 that there is no longer any different satellite, i.e., a satellite to be switched over, the processing operation goes to step 713, at which the microprocessor 11 takes therein the time differences $\Delta t_2$ to $\Delta t_5$, wherein $\Delta t_5$ is the time difference produced by the spare channel now on duty, and calculates the pseudo ranges $R_b$, $R_c$, $R_d$, $R_e$ between the newly determined satellites B, C, D, E and the user.

Then, at step 714, the positioning is executed on the basis of the thus calculated pseudo ranges $R_b$, $R_c$, $R_d$, $R_e$ and ephemeris data extracted from the signals of the satellites B, C, D, E. Thereafter, it is discriminated at step 715 whether or not the time $\tau$ has lapsed. If the time $\tau$ does not lapse yet, the processing operation returns to step 713 and repeats the execution of the positioning. Otherwise, the processing operation jumps back to step 701 and the same operation as mentioned above is repeated.

By the way, if the satellites determined at step 706 are C, D, E, F, it is judged at step 711 that there still exists a satellite to be switched over, i.e., from the satellite B to the satellite F. Then, the processing operation returns to step 708 through step 712. At step 712, a new spare channel is prepared by releasing the first channel, which was assigned to the satellite A so far, therefrom, and at step 708, the thus prepared spare channel is newly assigned to the satellite F.

Thereafter, the analogous processing operation to the foregoing is repeated by substituting the new combination of the satellites C, D, E, F for the old combination of the satellites A, B, C, D. Therefore, also in this embodiment, the load of the microprocessor 11 can be reduced.

As described above, according to this embodiment, different satellites are switched over one by one, in the case where one spare channel is provided in the receiver 5. If two spare channels are provided, the switchover of satellites can be carried out two satellites at a time. As a result, the switchover of satellites can be performed without a break.

We claim:

1. A signal receiving method in a user's device of a global positioning system (GPS), which has a receiver with plural channels capable of simultaneously receiving signals from plural satellites to be used for the positioning and a microprocessor for executing a predetermined processing for the positioning on the basis of the received satellite signals to thereby determine a precise position of a user, comprising:

step of detecting satellites available to the user from among GPS satellites on the basis of the relationship of positions of the GPS satellites and a roughly estimated position of the user;

step of calculating values of geometric dilution of precision (GDOP) with respect to every combination of satellites; each combination of satellites including plural satellites selected from among the available satellites detected, a number of which depends on the required dimension of the positioning; and step of determining satellites included in one of the combinations of satellites, which has a GDOP value smaller than a desired value, as the satellites to be used for the positioning, characterized by step of setting a present time with a predetermined operation period to periodically initiate said detecting step; and step of repeatedly executing the processing for the positioning on the basis of the signals from the satellites determined in said determining step through one operation period.

2. A signal receiving method as defined in claim 1, wherein the microprocessor is provided therein with almanac data concerning orbits of all the GPS satellites, and the positions of the GPS satellites at the present time are obtained by the calculation on the basis of the almanac data provided.

3. A signal receiving method as defined in claim 1, wherein the predetermined operation period is decided at such a value that satellites are selectively switched over with GDOP values of the combinations of satellites to be used in the respective operation periods always maintained less than the desired value.

4. A signal receiving method as defined in claim 1, wherein said detecting step detects a satellite as one of the available satellites, when a directional vector toward the satellite from the user is directed above the horizon.

5. A signal receiving method as defined in claim 1, wherein said setting step also sets a future time in addition to the present time, whereby said detecting step detects a first group of satellites available at the present time and a second group of satellites available at the future time, and the combinations of satellites in said calculating step preferentially include satellites common to the first and the second groups of satellites.

6. A signal receiving method as defined in claim 5, wherein the future time set by the setting step is a time, which is preceded by at least one operation period from the present time.

7. A signal receiving method as defined in claim 5, wherein the microprocessor is provided therein with almanac data concerning orbits of all the GPS satellites, and both the positions of the GPS satellites at the present time and the positions thereof at the future time are obtained on the basis of the almanac data provided.

8. A signal receiving method as defined in claim 5, wherein the predetermined operation period is decided at such a value that satellites are selectively switched over with GDOP values of the combinations of satellites to be used in the respective operation periods always maintained less than the desired value.

9. A signal receiving method as defined in claim 5, wherein said detecting step detects a satellite as one of the available satellites, when a directional vector toward the satellite from the user is directed above the horizon.

10. A signal receiving method as defined in claim 1, wherein said method further comprises:
   step of discriminating whether or not a first combination of satellites to be used, which is determined in said determining step of a present operation period, is the same as a second combination of satellites, which has been determined in said determining step of a preceding operation period;
   step of carrying out the switchover of satellites by substituting a new satellite, which is not included in the second combination, but in the first combination, for an old satellite, which is not included in the first combination, but in the second combination, if both the combinations include such different satellites;
   step of executing the positioning on the basis of the satellites of the second combination before the completion of said switchover step; and
   step of executing the positioning on the basis of the satellites of the first combination, when both the combinations include no different satellites or after said switchover step is completed.

11. A signal receiving method as defined in claim 10, wherein the plural channels of the receiver include at least one spare channel, and said switchover step comprises step of assigning a spare channel of the receiver to the new satellite to be substituted for the old satellite to prepare the spare channel for receiving a signal from the new satellite, in which the processing for the positioning is executed on the basis of the signals from the satellites of the second combination before the completion of the preparation of the spare channel and on the basis of the signals from the satellites of the first combination after the completion of the preparation of the spare channel.

12. A signal receiving method as defined in claim 10, wherein the microprocessor is provided therein with almanac data concerning orbits of all the GPS satellites, and the positions of the GPS satellites at the present time are obtained on the basis of the almanac data provided.

13. A signal receiving method as defined in claim 10, wherein the predetermined operation period is decided at such a value that satellites are selectively switched over with GDOP values of the combinations of satellites to be used in the respective operation periods always maintained less than the desired value.

14. A signal receiving method as defined in claim 10, wherein said detecting step detects a satellite as one of the available satellites, when a directional vector toward the satellite from the user is directed above the horizon.

* * * * *